(No Model.)
C. J. CURRY.
DEVICE FOR SECURING SPOKES TO WHEEL RIMS.
No. 574,139. Patented Dec. 29, 1896.
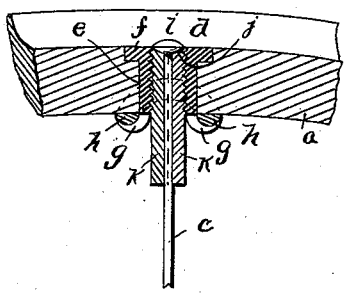
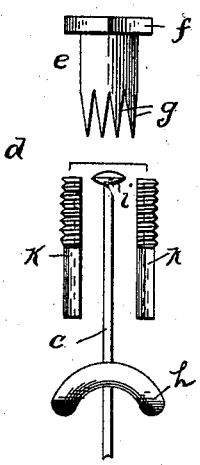
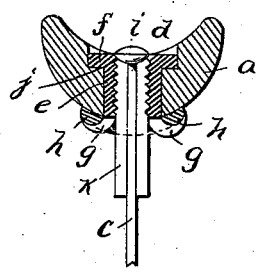
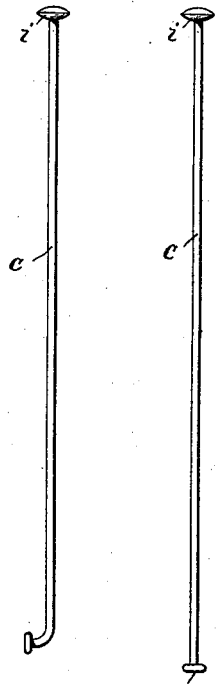
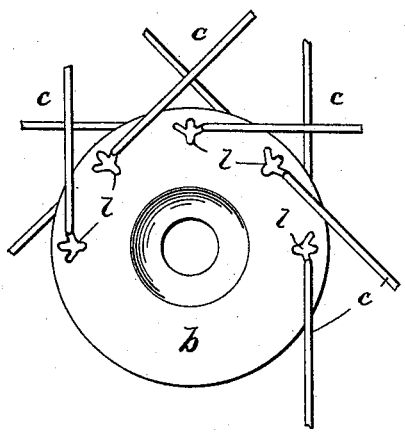
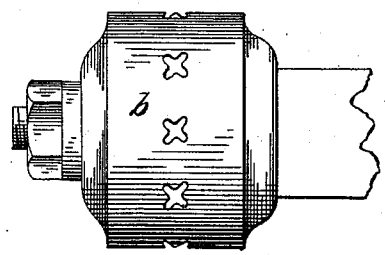
Witnesses
E. E. Duffy
C. M. Werle
Inventor
C. J. Curry
per O. E. Duffy
Attorney

UNITED STATES PATENT OFFICE.

CHARLES J. CURRY, OF KEY WEST, FLORIDA.

DEVICE FOR SECURING SPOKES TO WHEEL-RIMS.

SPECIFICATION forming part of Letters Patent No. 574,139, dated December 29, 1896.

Application filed April 15, 1896. Serial No. 587,687. (No model.)

*To all whom it may concern:*

Be it known that I, CHARLES J. CURRY, of Key West, in the county of Monroe and State of Florida, have invented certain new and useful Improvements in Spoke Sockets and Adjusters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain new and useful improvements in spoke sockets and adjusters.

The object of the invention is to provide a spoke-socket simple, cheap, and durable of construction, easy of adjustment, and composed of a minimum number of parts.

A further object of the invention is to provide means for quickly and accurately adjusting a loose spoke or replacing a broken one.

It is well known that a loose or broken spoke is often the cause of very serious injury to a wheel, and most especially to a bicycle-wheel, which is likely to become sprung and interfere with the frame or other parts of the machine.

A further object of this invention is to provide a threadless spoke, thus retaining its original strength throughout its entire length and preventing weakening by threading. The smooth spoke obviates the disadvantages, labor, and loss of time caused by corroded threads.

A further object of the invention is the provision of a spoke that may be easily adjusted without removing the wheel or tire.

The invention consists of certain novel features of construction and in combinations of parts more fully described hereinafter, and particularly pointed out in the claims.

Referring to the accompanying drawings, Figure 1 is a longitudinal section of a portion of a wheel, my invention applied. Fig. 2 is a cross-section thereof. Fig. 3 is a detail view of the socket, the several parts separated. Figs. 4 and 5 show, respectively, different designs of spokes. Fig. 6 shows a hub of a wheel adapted to be used with the spoke shown in Fig. 4. Fig. 7 shows a hub adapted to be used in connection with spoke shown in Fig. 5.

In the drawings, $a$ is the rim or felly of a wheel, and $b$ its hub carrying spokes $c$, secured in the rim $a$ by means of the improved socket $d$. This socket is provided with a screw-threaded sleeve $e$, having the flange $f$ countersunk in the outer periphery of the rim or felly of the wheel. The sleeve $e$ is split at its inner end to form ears or projections $g$, adapted to be bent over a washer $h$ on the inner periphery of the wheel. The free ends of the ears $g$, passing over the washer $h$, hold the sleeve securely in the rim.

The spoke is provided at its outer end with the head $i$, adapted to snugly rest in the seat $j$ of the split or sectional screw-threaded collar $k$. The collar $k$ is squared at its inner end to provide a hold for a wrench or the like, that it may be securely and suitably adjusted in the sleeve $e$. The washer $h$ is preferably flat on the side next the rim and shaped to fit snugly to the same.

The spoke shown in Fig. 4 has a head on its inner end and is bent to register with the slots or openings $l$ of the hub $b$, Fig. 6, and is adapted to be adjusted in said slots or openings $l$. These openings are peculiarly formed to receive the heads of the spokes and securely hold the same in the proper position.

The spoke shown in Fig. 5 is formed straight with a head $l'$ on its inner end, and is adapted to be held in the slots in the outer periphery of the hub shown in Fig. 7.

When a steel rim is used, the washer $h$ is made of a greater thickness in order to maintain the length of the sleeve $e$.

The inner walls of the sections composing the split screw-threaded collar $k$ are preferably smooth to allow it to freely turn on the spoke when the collar is being screwed into the sleeve $e$.

When it is desired to put in a new spoke, the head of the spoke is inserted in the enlarged portion of the slots or openings $l$ of the hub. The sections of the collar $k$ are then placed around the spoke, the head of which snugly fits in the seat $j$ of said collar. The collar is then screwed into the sleeve $e$, carrying the spoke into said collar until it has reached its proper position in the hub and is made taut from hub to rim. When the spoke has been properly adjusted, the outer head of which snugly fits in the seat of the sectional collar, and screwed into the sleeve, it will be seen that a tight joint is produced, preventing cement or the like from leaking in around the spoke.

The simplicity of this construction is obvious. The parts may be adjusted by any novice, no knowledge of mechanism being necessary.

It is evident that many slight changes might be made in the forms, construction, and arrangements of the parts described without departing from the spirit and scope of my invention.

What I claim is—

1. A spoke-socket comprising a sleeve inserted in the rim of a wheel, a flange at its outer end countersunk in the outer periphery of the rim, ears at its inner end adapted to turn back over a washer on the inner periphery of said rim as set forth and a sectional collar carrying a spoke, said collar secured in said sleeve for the purpose specified.

2. A spoke-securing device for wheels comprising a rim or felly carrying sockets, a hub having slots or openings, spokes headed at both ends and means for adjusting said spokes consisting of sleeve $e$, the washer $h$, a sectional collar secured in the sleeve for the purpose set forth.

In testimony that I claim the foregoing as my own I affix my signature in presence of two witnesses.

CHARLES J. CURRY.

Witnesses:
W. H. LOWE,
S. O. JOHNSON.